(12) United States Patent
Liu et al.

(10) Patent No.: US 10,297,879 B2
(45) Date of Patent: May 21, 2019

(54) TITANIUM DIBORIDE NANOTUBES FOR TRAPPING GASES IN LITHIUM ION BATTERIES

(71) Applicant: GM GLOBAL TECHNOLOGY OPERATIONS LLC, Detroit, MI (US)

(72) Inventors: Zhongyi Liu, Troy, MI (US); Ingrid A. Rousseau, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 15/198,851

(22) Filed: Jun. 30, 2016

(65) Prior Publication Data

US 2018/0006343 A1     Jan. 4, 2018

(51) Int. Cl.
| | | |
|---|---|---|
| *H01M 10/52* | (2006.01) | |
| *H01M 10/0525* | (2010.01) | |
| *H01M 4/485* | (2010.01) | |
| *H01M 4/02* | (2006.01) | |

(52) U.S. Cl.
CPC ......... *H01M 10/523* (2013.01); *H01M 4/485* (2013.01); *H01M 10/0525* (2013.01)

(58) Field of Classification Search
CPC . H01M 10/523; H01M 4/485; H01M 10/0525
See application file for complete search history.

(56) References Cited

U.S. PATENT DOCUMENTS

| | | |
|---|---|---|
| 7,736,805 B2 | 6/2010 | Nazri et al. |
| 8,101,152 B1 | 1/2012 | Halalay et al. |
| 8,399,138 B2 | 3/2013 | Timmons |
| 8,420,259 B2 | 4/2013 | Xiao et al. |
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,828,481 B2 | 9/2014 | Burton et al. |
| 8,835,056 B2 | 9/2014 | Xiao et al. |
| 9,005,814 B2 | 4/2015 | Naoi et al. |

(Continued)

OTHER PUBLICATIONS

Dillon, A. C. et al., "Proceedings of the 2000 DOE/NREL Hydrogen Program Review" (May 8-10, 2000), 20 pages.

(Continued)

*Primary Examiner* — Lisa S Park
(74) *Attorney, Agent, or Firm* — Harness, Dickey & Pierce, P.L.C.

(57) ABSTRACT

A lithium ion battery includes an electrolyte maintained in a separator, the separator having two sides; a negative electrode of lithium titanate ($Li_4Ti_5O_{12}$) disposed on one side of the separator; a negative current collector associated with the negative electrode; a positive electrode disposed on an opposite side of the separator; and a positive current collector associated with the positive electrode. The lithium ion battery further includes gas traps to trap gases in the battery, wherein the gas traps include titanium diboride ($TiB_2$) nanotubes. A method includes providing the titanium diboride nanotubes, carbon nanotubes, carbon fibers, and/or graphene as gas traps in a lithium ion battery having a negative electrode of lithium titanate.

17 Claims, 3 Drawing Sheets

(56) References Cited

U.S. PATENT DOCUMENTS

| | | | |
|---|---|---|---|
| 9,012,075 B2 | 4/2015 | Verbrugge et al. | |
| 9,034,519 B2 | 5/2015 | Xiao et al. | |
| 9,093,705 B2 | 7/2015 | Xiao et al. | |
| 9,142,830 B2 | 9/2015 | Xiao et al. | |
| 9,153,819 B2 | 10/2015 | Huang et al. | |
| 9,236,600 B2 | 1/2016 | Wang et al. | |
| 9,356,281 B2 | 5/2016 | Verbrugge et al. | |
| 9,362,551 B2 | 6/2016 | Sachdev et al. | |
| 9,362,552 B2 | 6/2016 | Sohn et al. | |
| 9,583,767 B2 | 2/2017 | Verbrugge et al. | |
| 2010/0310941 A1* | 12/2010 | Kumta | H01B 1/04 429/231.95 |
| 2012/0064409 A1 | 3/2012 | Zhamu et al. | |
| 2012/0100403 A1 | 4/2012 | Wang et al. | |
| 2012/0229096 A1 | 9/2012 | Nazri | |
| 2012/0328927 A1 | 12/2012 | Timmons et al. | |
| 2013/0099159 A1 | 4/2013 | Halalay et al. | |
| 2013/0210610 A1* | 8/2013 | Veith | B01J 27/24 502/5 |
| 2014/0295277 A1* | 10/2014 | Yoshida | C01B 25/45 429/221 |
| 2015/0056515 A1* | 2/2015 | Kim | H01M 4/483 429/231.5 |
| 2015/0244031 A1* | 8/2015 | Adamson | H01M 10/24 429/188 |
| 2017/0098817 A1 | 4/2017 | Yu et al. | |

OTHER PUBLICATIONS

Meng, Shawn et al., "Metal-Diboride Nanotubes as High-Capacity Hydrogen Storage Media," *Nano Lett.*, vol. 7, No. 3, (Feb. 23, 2017) pp. 663-667.

* cited by examiner

TITANIUM DIBORIDE NANOTUBES FOR TRAPPING GASES IN LITHIUM ION BATTERIES

TECHNICAL FIELD

The present disclosure relates generally to lithium ion batteries, and, in particular to lithium ion batteries in which the negative electrode is lithium titanate.

BACKGROUND

Secondary, or rechargeable, lithium ion batteries are used in many stationary and portable devices, such as those encountered in the consumer electronic, automobile, and aerospace industries. The lithium class of batteries has gained popularity for various reasons, including a relatively high energy density, a general non-appearance of any memory effect when compared to other kinds of rechargeable batteries, a relatively low internal resistance, a low self-discharge rate when not in use, and an ability to be formed into a wide variety of shapes (e.g., prismatic) and sizes so as to efficiently fill available space in electric vehicles, cellular phones, and other electronic devices. In addition, the ability of lithium batteries to undergo repeated power cycling over their useful lifetimes makes them an attractive and dependable power source.

SUMMARY

A lithium ion battery includes an electrolyte maintained in a separator, the separator having two sides. A negative electrode including a lithium titanate ($Li_4Ti_5O_{12}$) active material is disposed on one side of the separator, and a negative current collector is associated with the negative electrode. A positive electrode is disposed on an opposite side of the separator, and a positive current collector is associated with the positive electrode. The lithium ion battery includes gas traps to trap gases in the battery, wherein the gas traps include titanium diboride ($TiB_2$) nanotubes. A method includes providing gas traps in a lithium ion battery having a negative electrode including lithium titanate ($Li_4Ti_5O_{12}$), in which the gas traps are titanium diboride ($TiB_2$) nanotubes, carbon nanotubes, carbon fibers, and/or graphene.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
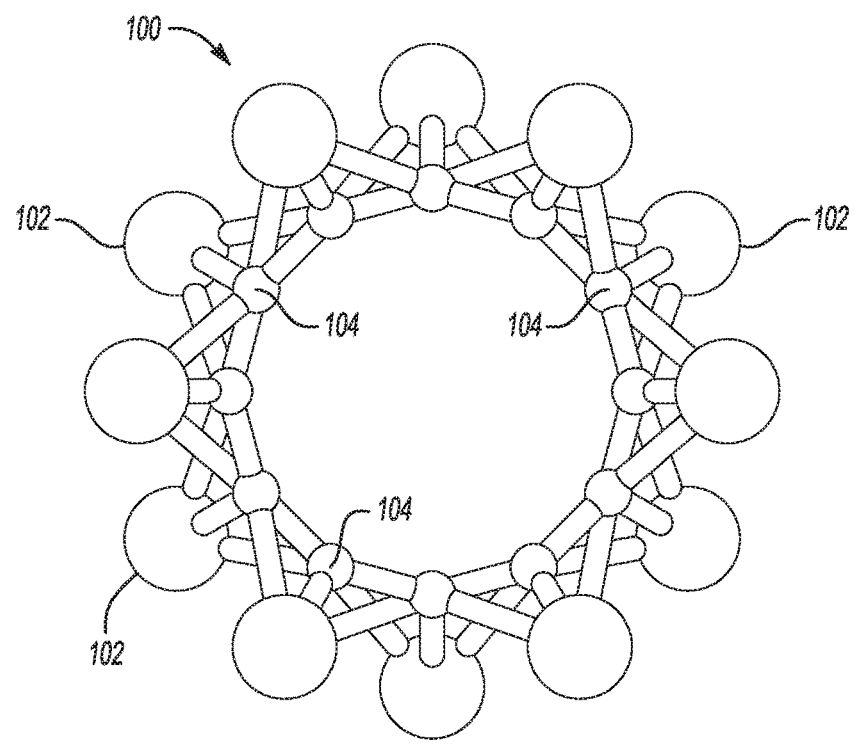
FIGS. 1A and 1B schematically depict an example of a single wall titanium diboride nanotube and a double wall titanium diboride nanotube, respectively.

In some of the examples disclosed herein, a lithium ion battery, having a negative electrode that includes lithium titanate ($Li_4Ti_5O_{12}$) in contact with an electrolyte, is improved by the inclusion of gas traps of titanium diboride ($TiB_2$) nanotubes. The $TiB_2$ nanotubes trap gases generated during operation of the battery.

A lithium ion battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also accompanied by a respective current collector. The current collectors associated with the two electrodes are connected by an interruptible external circuit that allows an electric current to pass between the electrodes to electrically balance the related migration of lithium ions. Further, the negative electrode may include a lithium insertion host material, such as lithium titanate, and the positive electrode may include an active material that can store lithium ions at a higher electric potential than the lithium insertion host material of the negative electrode.

Briefly, for lithium ion batteries in which the negative electrode (anode) is lithium titanate ($Li_4Ti_5O_{12}$, LTO, also called spinel lithium titanate due to its spinel crystal structure), the positive electrode (cathode) may be lithium ion active materials, such as layered lithium transition metal oxides. For example, the lithium ion active material may be spinel lithium manganese oxide ($LiMn_2O_4$, LMO), lithium nickel manganese cobalt oxide ($LiNi_xCo_yMn_{1-x-y}O_2$, NMC), lithium cobalt oxide ($LiCoO_2$, LCO), a manganese-nickel oxide spinel [$Li(Mn_{1.5}Ni_{0.5})O_2$, LMNO], lithium iron phosphate ($LiFePO_4$, LFP), or a layered nickel manganese cobalt oxide (having a general formula of $xLi_2MnO_3 \cdot (1-x)LiMO_2$, where M is composed of any ratio of Ni, Mn and/or Co). In other examples, the positive electrode may be non-lithium ion active materials, such as metal oxides, including, but not limited to, manganese oxide ($Mn_2O_4$), cobalt oxide ($CoO_2$), a nickel-manganese oxide spinel, a layered nickel manganese cobalt oxide, or an iron polyanion oxide, such as iron phosphate ($FePO_4$) or iron fluorophosphate ($FePO_4F$), or vanadium oxide ($V_2O_5$).

LTO is a particularly desirable negative electrode material. Many Li-based batteries can suffer from capacity fade attributable to many factors, including the formation of a passive film known as a solid electrolyte interphase (SEI) layer over the surface of the negative electrode, which is often generated by reaction products of the negative electrode material, electrolyte reduction, and/or lithium ion reduction. The SEI layer formation plays a significant role in determining electrode behavior and properties including cycle life, irreversible capacity loss, high current efficiency, and high rate capabilities, particularly advantageous for power battery and start-stop battery use. LTO has a high cut voltage (e.g., cut-off potential relative to a lithium metal reference potential) that desirably minimizes or avoids SEI formation, and is a zero-strain material having minimal volumetric change during lithium insertion and deinsertion, which enables long term cycling stability, high current efficiency, and high rate capabilities. Such long term cycling stability, high current efficiency, and high rate capabilities are particularly advantageous for power battery and start-stop battery use.

LTO is a promising negative electrode material for high power lithium ion batteries, as described above. However, when used with certain positive electrode materials and electrolytes, LTO may potentially present certain challenges. For example, it has been observed that $Li_{4+x}Ti_5O_{12}$ can generate significant quantities of gas, which mainly consists of hydrogen, within a battery cell, especially at elevated temperature conditions under a charging state. Such gas formation could make LTO a less desirable choice for commercial use.

Without subscribing to any particular theory, the mechanism for such outgassing appears to be:

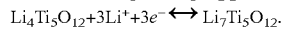

In the mechanism, $Ti^{4+}$ in $Li_4Ti_5O_{12}$ is partially reduced to $Ti^{4+}/Ti^{3+}$ in $Li_7Ti_5O_{12}$. The $Ti^{3+}$ may react with hydrogen ions to form $Ti^{4+}$ and hydrogen gas as follows:

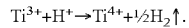

Thus, it can be appreciated that outgassing comes, primarily at least, from the generation of hydrogen gas. It is believed that $Ti^{3+}$ catalyzes electrolyte reduction reaction to also generate gases such as $CO_2$, CO, $N_2$, and other gases.

The generation of gases in $Li_4Ti_5O_{12}$ lithium ion power batteries during operation is a long-standing problem. Previous studies have shown that coatings, such as carbon and metal oxides, can suppress the gassing issue to a certain extent, but cannot solve the problem completely.

The example lithium ion batteries disclosed herein exhibit reduced outgassing. The present inventors have unexpectedly found that titanium diboride ($TiB_2$) nanotubes can be used as traps to trap hydrogen gas and other gases, where trapping immobilizes the gases to thereby improve the cycle life of high power lithium ion batteries.

In an example of the present disclosure, a lithium ion battery includes an electrolyte maintained in a separator, the separator having two sides. A negative electrode including a lithium titanate ($Li_4Ti_5O_{12}$) active material is disposed on one side of the separator, and a negative current collector is associated with the negative electrode. A positive electrode is disposed on an opposite side of the separator, and a positive current collector is associated with the positive electrode. The lithium ion battery includes gas traps to trap gases in the battery, wherein the gas traps are titanium diboride ($TiB_2$) nanotubes.

By far, the most significant gas generated in a lithium ion battery is hydrogen ($H_2$, up to about 70 volume percent (vol. %)). The remaining gases, in order of amount generated, include carbon dioxide ($CO_2$, about 20 vol. %), nitrogen ($N_2$, about 5 vol. % to 10 vol. %), and carbon monoxide (CO, less than or equal to 5 vol. %).

Since $TiB_2$ nanotubes trap hydrogen gas, then a significant portion of the total gases generated in a lithium ion battery are removed or otherwise immobilized. At least some of the remaining gases may also be trapped by $TiB_2$ nanotubes. For example, the binding energy of $TiB_2$ for CO is about 1.43 eV/CO molecule (for comparison, the binding energy of $TiB_2$ for $H_2$ ranges from about 0.2 to about 0.6 eV/$H_2$ molecule). Based on above binding energies, $TiB_2$ may trap CO as well.

Figure 1B:
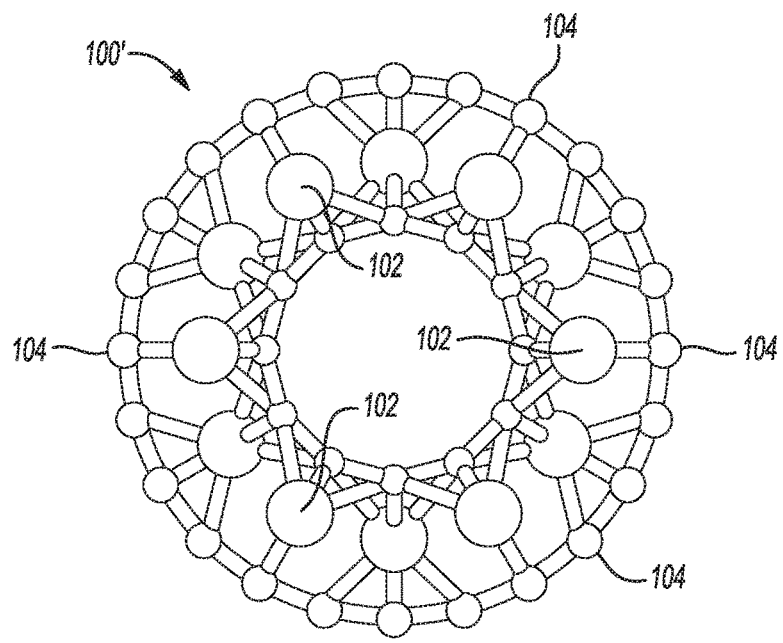

$TiB_2$ can form single-walled nanotubes, double-walled nanotubes, and multi-walled (i.e., ≥3) nanotubes. FIG. 1A is a schematic view of a single-walled $TiB_2$ nanotube 100, showing the arrangement of titanium atoms 102 and boron atoms 104. FIG. 1B is a schematic view of a double-walled $TiB_2$ nanotube 100', also showing the arrangement of titanium atoms 102 and boron atoms 104. A multi-walled $TiB_2$ nanotube may have an alternating arrangement of a layer of Ti atoms 102 and a layer of B atoms 104, based on the double-walled $TiB_2$ nanotube 100' shown in FIG. 1B.

The simplest form of $TiB_2$ nanotubes are the single-walled nanotubes 100, which may be separated from each other. This is because the attraction between two $TiB_2$ single-walled nanotubes 100 is weak, with only 0.027 eV/atom at the nearest Ti—Ti distance of 3 Ångstroms. Single-walled $TiB_2$ nanotubes 100 may be chosen, in some instances, for desirable $H_2$ absorption capacity. The inner diameter (i.e., inside diameter) of the single-walled $TiB_2$ nanotubes 100 may be within a range of about 2 nm to about 20 nm. The outer diameter (i.e., outside diameter) of the single-walled $TiB_2$ nanotubes 100 may be within a range of about 2.6 nm to about 20.6 nm and the length may be within a range of about 50 nm to about 1 μm.

The values for the outside diameter may be determined from the following consideration: if the transformation from single-walled nanotubes 100 to multi-walled nanotubes 100' occurs (usually the nanotubes are single-walled because of the weak attraction stated above, but sometimes transformation from single-walled to multi-walled does occur), then 2 to 20 layers of $TiB_2$ may be formed. As such, the outer diameter of the multi-walled nanotubes 100' may vary depending upon the number of layers. Each layer may have a thickness of about 3 Ångstroms (0.3 nm), and thus the outer diameter of the multi-walled nanotubes 100' may be within the range of about 2.6 nm to about 20.6 nm.

The $TiB_2$ nanotubes may be intentionally included in the lithium ion battery in the negative electrode, or in the positive electrode, or on the separator, or combinations thereof. In the negative electrode, which has lithium titanate ($Li_4Ti_5O_{12}$; LTO) active material, the $TiB_2$ nanotubes 100, 100' may be present in an amount of about 0.01 weight percent (wt. %) to about 1 wt. %, based on the total weight percent of the LTO active material. Likewise, for the positive electrode and the separator, the $TiB_2$ nanotubes may be present in the same concentration range, based on the total weight percent of the LTO active material in the negative electrode 12.

Figure 2:
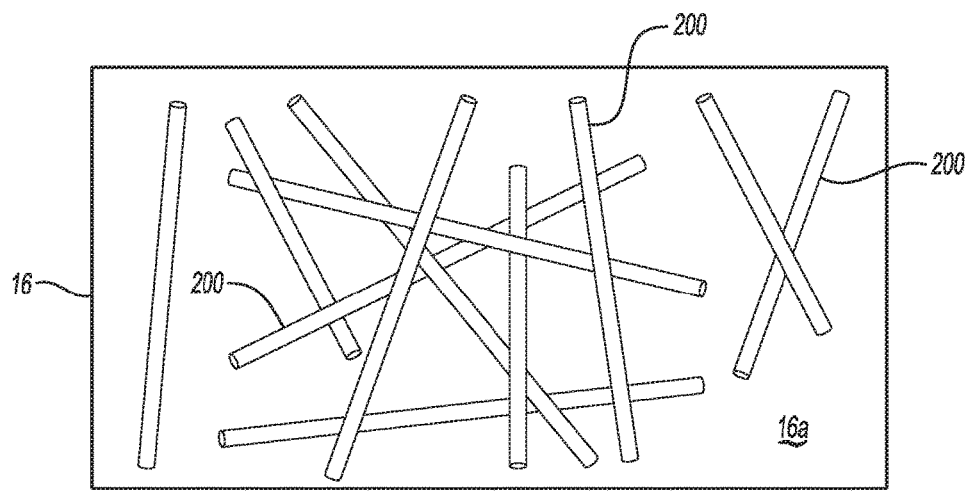
FIG. 2 schematically illustrates an example of titanium diboride nanotubes attached to a separator for use in a lithium ion battery.

FIG. 2 depicts a plurality of $TiB_2$ nanotubes 200 (which may be single-walled nanotubes 100 and/or multi-walled nanotubes 100') lying on a surface 16a of a separator 16. The $TiB_2$ nanotubes 200 may be adhered to the surface 16a using any suitable technique. As an example, the technique may involve preparing or otherwise obtaining a dispersion of the nanotubes 200 in a suitable coating material, and then coating the surface 16a with the dispersion and drying. Examples of coating methods include spray coating and doctor blading.

Figure 3:
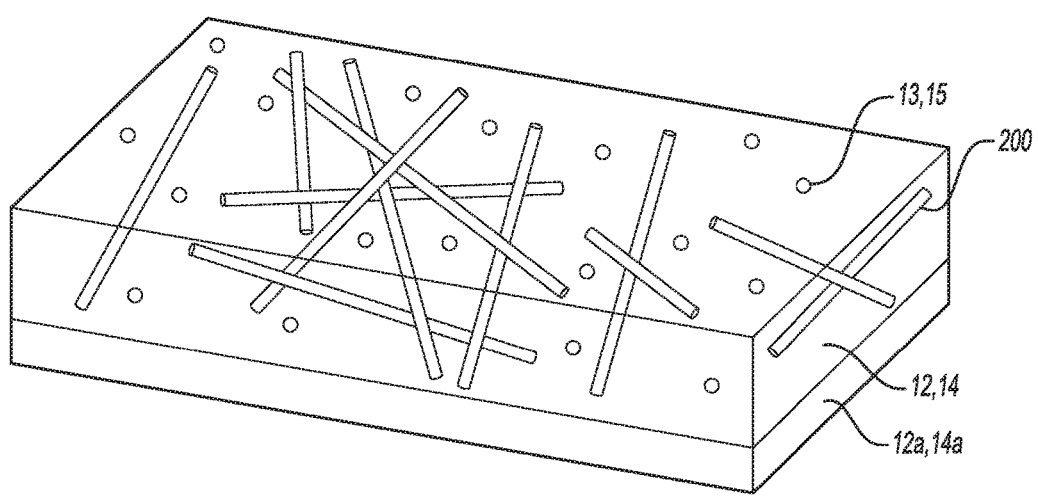
FIG. 3 schematically illustrates a perspective view of an example of a generic electrode on a current collector with titanium diboride nanotubes mixed among active material particulates.

FIG. 3 depicts a plurality of $TiB_2$ nanotubes 200 incorporated within an electrode 12, 14. A current collector 12a, 14a supports the electrode 12, 14, respectively. The fabrication of electrodes 12, 14 that incorporate the $TiB_2$ nanotubes 200 is described in greater detail below. Essentially, the process for forming the electrodes 12, 14 involves mixing the respective active electrode material 13, 15 with binder(s) (not shown), conductive agent(s) (not shown), and the nanotubes 200, and adding a liquid to form a slurry. The slurry is deposited on the current collector 12a, 14a and then dried to evaporate the liquid/solvent, leaving behind the mixture of powders that form the electrode 12, 14.

Figure 4:
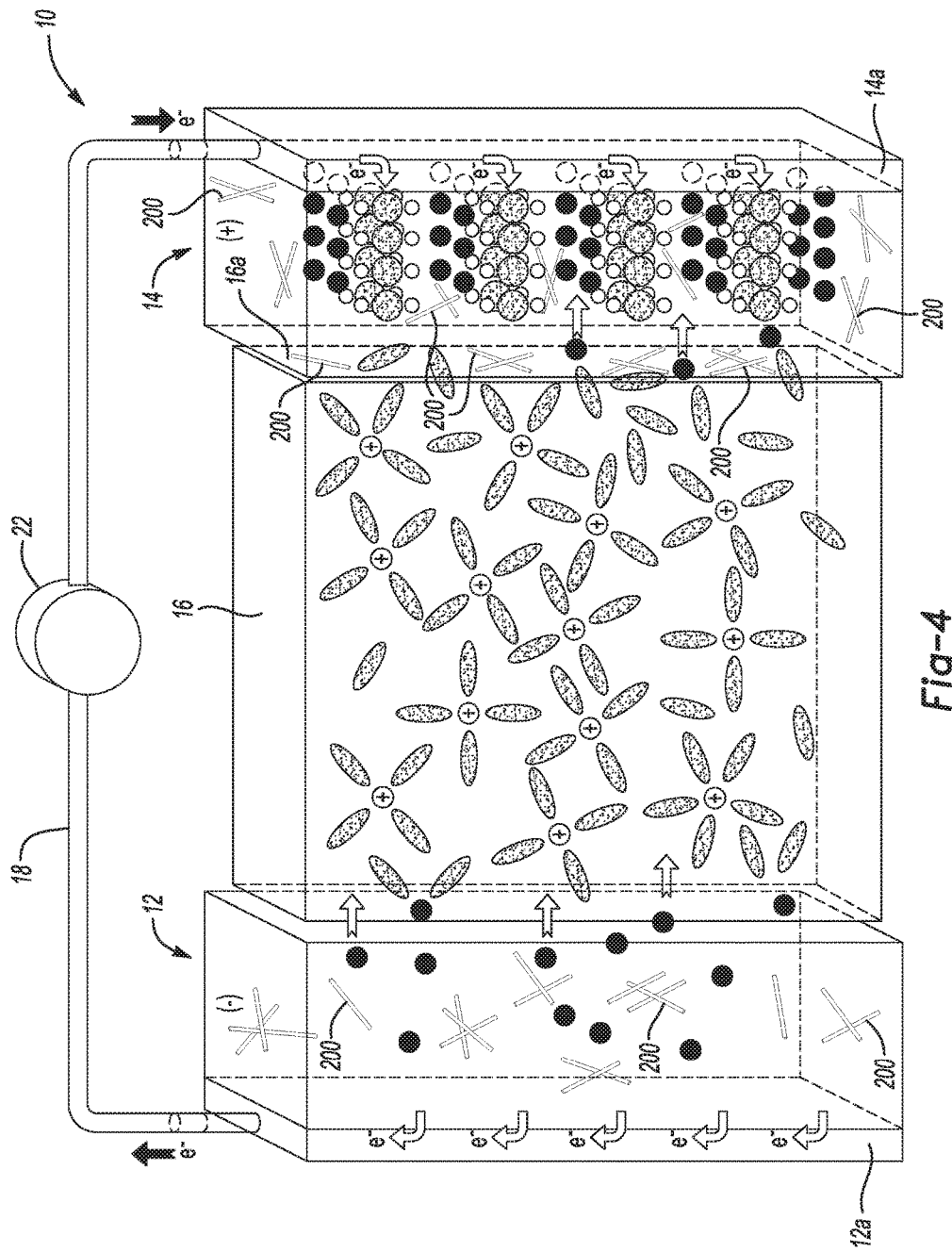
FIG. 4 schematically illustrates an example of a lithium ion battery during a discharging state, wherein both the negative electrode and the positive electrode include the titanium diboride nanotube structures within the respective electrodes and wherein the separator includes the titanium diboride nanotube structures on a surface thereof.

Referring now to FIG. 4, an example of a lithium ion battery 10 is illustrated. The lithium ion battery 10 generally includes negative electrode 12, negative-side current collector 12a, positive electrode 14, positive-side current collector 14a, and polymer separator 16 disposed between the negative electrode 12 and the positive electrode 14. An interruptible external circuit 18 connects the negative electrode 12 and the positive electrode 14. Each of the negative electrode 12, the positive electrode 14, and the polymer separator 16 are soaked in an electrolyte solution capable of conducting lithium ions.

The negative-side current collector 12a and the positive-side current collector 14a may be positioned in contact with the negative electrode 12 and the positive electrode 14, respectively, to collect and move free electrons to and from the external circuit 18. The negative electrode 12 may be formed directly on the negative-side current collector 12a and the positive electrode 14 may be formed directly on the positive-side current collector 14 using the methods disclosed herein. Examples of the current collectors 12a and 14a are described below.

The lithium ion battery 10 may support a load device 22 that can be operatively connected to the external circuit 18. The load device 22 may be powered fully or partially by the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be a power-generating apparatus that charges the lithium ion battery 10 for purposes of storing energy. For instance, the tendency of windmills and solar panels to variably and/or intermittently generate electricity often results in a need to store surplus energy for later use.

The lithium ion battery 10 can include a wide range of other components that, while not depicted here, are nonetheless known to skilled artisans. For instance, the lithium ion battery 10 may include a casing, gaskets, terminals, tabs, and any other desirable components or materials that may be situated between or around the negative electrode 12 and the positive electrode 14 for performance-related or other practical purposes. Moreover, the size and shape of the lithium ion battery 10, as well as the design and chemical make-up of its main components, may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10 may also be connected in series and/or in parallel with other similar lithium ion batteries to produce a greater voltage output and current (if arranged in parallel) or voltage (if arranged in series) if the load device 22 so requires.

The lithium ion battery 10 can generate a useful electric current during battery discharge by way of reversible electrochemical reactions that occur when the external circuit 18 is closed to connect the negative electrode 12 and the positive electrode 14 at a time when the negative electrode 12 contains a sufficiently higher relative quantity of lithium insertion/deinsertion material. The chemical potential difference between the positive electrode 14 and the negative electrode 12 (ranging from approximately 1.5V to 5.0V, depending on the exact chemical make-up of the electrodes 12, 14) drives electrons produced by the oxidation of lithium titanate at the negative electrode 12 through the external circuit 18 towards the positive electrode 14. Lithium ions, which are also produced at the negative electrode 12, are concurrently carried by the electrolyte solution through the polymer separator 16 and towards the positive electrode 14. The electrons flowing through the external circuit 18 and the lithium ions migrating across the polymer separator 16 in the electrolyte solution eventually reconcile and form inserted lithium at the positive electrode 14. The electric current passing through the external circuit 18 can be harnessed and directed through the load device 22 until the level of inserted lithium in the negative electrode 12 falls below a workable level or the need for electrical energy ceases.

The lithium ion battery 10 can be charged or re-powered at any time after a partial or full discharge of its available capacity by applying an external battery charger to the lithium ion battery 10 to reverse the electrochemical reactions that occur during battery discharge. The connection of an external battery charger to the lithium ion battery 10 compels the otherwise non-spontaneous oxidation of, e.g., lithium transition metal oxide at the positive electrode 14 to produce electrons and release lithium ions. The electrons, which flow back towards the negative electrode 12 through the external circuit 18, and the lithium ions, which are carried by the electrolyte across the polymer separator 16 back towards the negative electrode 12, reunite at the negative electrode 12 and replenish it with inserted lithium for consumption during the next battery discharge cycle.

The external battery charger that may be used to charge the lithium ion battery 10 may vary depending on the size, construction, and particular end-use of the lithium ion battery 10. Examples of some suitable external power sources include a battery charger plugged into an AC wall outlet and a motor vehicle alternator.

As previously described, the lithium ion battery 10 generally operates by reversibly passing lithium ions between the negative electrode 12 and the positive electrode 14. In the fully charged state, the voltage of the battery 10 is at a maximum (typically in the range 1.5V to 5.0V); while in the fully discharged state, the voltage of the battery 10 is at a minimum (typically in the range 0V to 2.0V). Essentially, the Fermi energy levels of the active materials in the positive and negative electrodes 14, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the negative electrode 12 of the lithium ion battery 10 contains a high concentration of inserted lithium while the positive electrode 14 is relatively depleted. When the negative electrode 12 contains a sufficiently higher relative quantity of inserted lithium, the lithium ion battery 10 can generate a beneficial electric current by way of the previously described reversible electrochemical reactions that occur when the external circuit 18 is closed to connect the negative electrode 12 and the positive electrode 14. The establishment of the closed external circuit under such circumstances causes the extraction of inserted lithium from the negative electrode 12. The extracted lithium atoms are split into lithium ions (identified by the black dots and by the open circles having a (+) charge) and electrons (e⁻) as they leave an insertion host at the negative electrode-electrolyte interface.

The negative electrode 12 includes lithium titanate as the active material 13. The negative electrode 12 may include the titanium diboride nanotubes 200, present in an amount ranging from about 0.01 wt. % to about 1 wt. % based on the amount of lithium titanate in the negative electrode 12. The titanium diboride nanotubes 200 may be distributed throughout the interior of the negative electrode 12, such as shown with respect to FIGS. 3 and 4.

The negative electrode 12 may also include conductive filler. The conductive filler may be carbon black or graphite. When included, the carbon black may be present in an amount ranging from about 5 wt. % to about 15 wt. % based on the composition of the negative electrode 12. The carbon black conductive filler may have a BET surface area greater than 50 m$^2$/g. An example of the carbon black conductive filler is SUPER P® (available from Timcal Graphite & Carbon (Bodio, Switzerland)). When included, the graphite may be present in an amount ranging from greater than 0 wt. % to about 3 wt. % based on the composition of the negative electrode 12. The graphite conductive filler may have D50 of less than 8 μm, and may have a BET surface area ranging from about 5 m$^2$/g to about 30 m$^2$/g. Commercial forms of graphite that may be used as a conductive filler in the negative electrode 12 are available from, for example, Timcal Graphite & Carbon, Lonza Group (Basel, Switzerland), or Superior Graphite (Chicago, Ill.). One specific example is TIMREX® KS6 (primary synthetic graphite from Timcal Graphite & Carbon).

The negative electrode 12 may also include a binder present in an amount ranging from about 1 wt. % to about 15 wt. % based on the composition of the negative electrode 12. In an example, the binder is present in an amount ranging from about 2 wt. % to about 8 wt. % based on the composition of the negative electrode 12. The binder may be polyvinylidene fluoride (PVDF), polytetrafluoroethylene (PTFE), carboxymethylcellulose sodium and polymerized styrene butadiene rubber (CMC+SBR), LA133, or LA132 or combinations thereof. LA133 is an aqueous binder that is a water dispersion of acrylonitrile multi-copolymer and LA132 is an aqueous binder, which is believed to be a triblock copolymer of acrylamide, lithium methacrylate, and acrylonitrile; both of these acrylonitrile copolymers are available from Chengdu Indigo Power Sources Co., Ltd., Sichuan, P.R.C.

The negative electrode 12 may also include carbon-based materials that serve to trap gases. More particularly, the presence of any of carbon nanotubes, carbon fibers, and graphene in the negative electrode 12, in addition to TiB$_2$ nanotubes 200, may serve to trap gases, such as hydrogen, that are generated during operation of the battery 10. The carbon nanotubes, carbon fibers, graphene, and titanium diboride (TiB$_2$ nanotubes 200) may be used separately or in any combination, within the total concentration of about 0.01 wt. % to about 1 wt. % based on the amount of LTO.

It will be appreciated that H$_2$ trapping is a physical phenomenon, where surface area of the trap plays a dominant role. As an example, the surface area of any of the gas traps (i.e., TiB$_2$ or carbon-based material traps) may range from about 500 m$^2$/g and 2500 m$^2$/g. In an example, the carbon-based material has a single-walled nanotubular shape to maximize the surface area accessible to H$_2$ and thus maximize H$_2$ trapping (up to 6.5 wt. %). For example, the carbon nanotubes may have an outer diameter ranging from about 8 nm to about 25 nm and a length ranging from about 0.5 μm to about 20 μm. Likewise, carbon fibers and graphene are suitable as traps because their surface area is strongly dependent on their structure, such as morphologies and dimensions. As such, the morphologies and dimensions may be selected in order to maximize gas trapping. For example, the carbon fibers (such as activated carbon fibers) may be in the form of fibers having a diameter ranging from about 30 nm to about 200 nm, a length ranging from about 0.5 μm to about 10 μm, and a BET surface area ranging from about 1000 m$^2$/g to about 2500 m$^2$/g. It is to be understood that other carbon fiber dimensions may be utilized to increase the surface area for gas trapping. For another example, a single-layer of graphene up to a few, e.g., 3, layers of graphene also has a large surface area for gas trapping. On the other hand, other forms of carbon that may be used to enhance electrical conductivity, such as graphite, may be unsuitable for trapping H$_2$ due to the small surface area (e.g., exterior surface only), because the amount of H$_2$ that can be trapped is limited to a negligible level.

It will be appreciated that the presence of any of the carbon nanotubes, carbon fibers, and graphene in the negative electrode 12, while serving as gas traps, may also augment the carbon black and/or graphite as conductive filler.

One example of the composition of the negative electrode 12 includes about 80 wt. % lithium titanate, about 10 wt. % graphite, about 10 wt. % PVDF and about 0.08 wt. % TiB$_2$ (based on 0.1 wt. % of 80 wt % lithium titanate). In this example, carbon, in the form of nanotubes, carbon fibers, and/or graphene, may be added separately or jointly (instead of or in addition to the TiB$_2$ nanotubes) in an amount based on 0.1 wt. % of the lithium titanate. It will be appreciated that while carbon is often added to the negative electrode 12 to provide conductivity, carbon nanotubes, carbon fibers, and/or graphene may also trap hydrogen gas, as discussed above.

Adjacent to the negative electrode 12 is the negative-side current collector 12a, which may be formed from copper or aluminum. In an example, the aluminum may be in the form of bare aluminum foil. The thickness of the negative-side current collector 12a may range from about 15 μm to about 25 μm. In another example, the negative-side current collector 12a may be carbon-coated on at least one side. When the carbon coating is included, the thickness of the carbon coating on one side of the current collector 12a ranges from about 0.1 μm to about 2 μm.

Additional features of the negative electrode 12 may include: a porosity ranging from about 28% to about 44%; a moisture content less than 700 ppm; an electrical conductivity that is less than 2Ω·cm; a pressing density (the density after pressing the electrode) ranging from about 1.8 g/cm$^3$ to about 2.2 g/cm$^3$. When the negative electrode 12 is coated on one side of the current collector 12a, the capacity loading may range from about 0.28 mAh/cm$^2$ to about 0.84 mAh/cm$^2$. The moisture content may be measured by the Karl Fisher method, such as with a C30 Compact Karl Fischer Coulometer, available from Mettler Toledo International, Inc. (Columbus, Ohio).

For lithium ion batteries 10, the positive electrode 14 may include any suitable active material 15 (FIG. 3) or combinations thereof, present in an amount ranging from about 70 wt. % to about 95 wt. % based on the composition of the positive electrode 14. More specifically, a common class of known lithium based active materials suitable for this example of the positive electrode 14 includes layered lithium transition metal oxides. For example, the lithium ion active material may be spinel lithium manganese oxide ($LiMn_2O_4$, LMO), lithium cobalt oxide ($LiCoO_2$), a manganese-nickel oxide spinel [$Li(Mn_{1.5}Ni_{0.5})O_2$], or a layered nickel manganese cobalt oxide (having a general formula of $xLi_2MnO_3 \cdot (1-x)LiMO_2$, where M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable lithium ion active materials include $Li(Ni_{1/3}Mn_{1/3}Co_{1/3})O_2$, $Li_{x+y}Mn_{2-y}O_4$ (LMO, 0<x<1 and 0<y<0.1), or a lithium iron polyanion oxide, such as lithium iron phosphate ($LiFePO_4$, LFP) or lithium iron fluorophosphate ($Li_2FePO_4F$), or a lithium rich layer-structure. Still other lithium based active materials may also be utilized, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$) or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (where M is composed of any ratio of Co, Fe, and/or Mn), lithium nickel manganese cobalt oxide ($LiNi_xCo_yMn_{1-x-y}O_2$, NMC), and any other high energy nickel-manganese-cobalt material (HE-NMC). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

When lithium manganese oxide (LMO) is selected as the active material 15 in the positive electrode 14, the particle size distribution of the lithium manganese oxide may have D50 of less than 10 μm and D95 of less than 20 μm. In other words, 50% of the lithium manganese oxide particles have a size smaller than 10 μm and 95% of the lithium manganese oxide particles have a size smaller than 20 μm. The BET surface area of the lithium manganese oxide particles may range from about 0.4 $m^2$/g to about 1.2 $m^2$/g. At a C-rate of 1 C, the lithium manganese oxide particles with these specifications exhibit a capacity ranging from about 95 mAh/g to about 110 mAh/g.

When lithium nickel manganese cobalt oxide (NMC) is selected as the active material 15 in the positive electrode 14, the particle size distribution of the lithium nickel manganese cobalt oxide may have D50 of less than 8 μm and D95 of less than 15 μm. In other words, 50% of the lithium nickel manganese cobalt oxide particles have a size smaller than 8 μm and 95% of the lithium nickel manganese cobalt oxide particles have a size smaller than 15 μm. The BET surface area of the lithium nickel manganese cobalt oxide particles ranges from about 0.4 $m^2$/g to about 1.0 $m^2$/g. At a C-rate of 1 C, the lithium nickel manganese cobalt oxide particles with these specifications exhibit a capacity ranging from about 135 mAh/g to about 300 mAh/g.

The positive electrode 14 may include the titanium diboride nanotubes 200, present in an amount ranging from about 0.01 wt. % to about 1 wt. % based on the amount of the active material (lithium titanate) in the negative electrode 12. The titanium diboride nanotubes 200 may be distributed throughout the interior of the positive electrode 14, such as shown with respect to FIG. 3.

The positive electrode 14 may also include conductive filler, wherein the conductive filler may be carbon black and/or graphite. When included, the carbon black may be present in an amount ranging from about 1 wt. % to about 6 wt. % based on the composition of the positive electrode 14. The carbon black conductive filler may have a BET surface area greater than 50 $m^2$/g. An example of the carbon black conductive filler is SUPER P® (available from Timcal Graphite & Carbon (Bodio, Switzerland)). When included, the graphite may be present in an amount ranging from greater than 0 wt. % to about 3 wt. % based on the composition of the positive electrode 14. In an example, the graphite conductive filler has D50 of less than 8 μm, and a BET surface area ranging from about 5 $m^2$/g to about 30 $m^2$/g. Commercial forms of graphite that may be used as a conductive filler in the positive electrode 14 are available from, for example, Timcal Graphite & Carbon (Bodio, Switzerland), Lonza Group (Basel, Switzerland), or Superior Graphite (Chicago, Ill.). One specific example is TIMREX® KS6 (primary synthetic graphite from Timcal Graphite & Carbon.

The positive electrode 14 may also include a binder present in an amount ranging from about 1 wt. % to about 8 wt. % based on the composition of the positive electrode 14. In an example, the binder is present in an amount ranging from 1 wt. % to about 5 wt. % based on the composition of the positive electrode 14. The binder may be any of the same binders listed above, namely, polyvinylidene fluoride (PVDF), polytetrafluoroethylene (PTFE), carboxymethylcellulose sodium and polymerized styrene butadiene rubber (CMC+SBR), LA133, or LA132 or combinations thereof.

As with the negative electrode 12, the presence of any of carbon nanotubes, graphene, and carbon fiber in the positive electrode 14, in addition to $TiB_2$ nanotubes 200, may serve to trap gases, such as hydrogen, generated during operation of the battery 10. The carbon nanotubes, carbon fibers, graphene, and titanium diboride ($TiB_2$ nanotubes 200) may be used separately or in any combination, within the total concentration of about 0.01 wt. % to about 1 wt. % based on the amount of the lithium titanate active material 13.

One example of the composition of the positive electrode 14 includes about 80 wt. % LMO or NMC, about 10 wt. % graphite, about 10 wt. % PVDF, and about 0.08 wt % $TiB_2$ (based on 0.1% of 80 wt % lithium titanate in the negative electrode 12).

Adjacent to the positive electrode 14 is the positive-side current collector 14a, which may be formed from aluminum. The thickness of the positive-side current collector 14a may range from about 15 μm to about 25 μm. In an example, the aluminum may be in the form of foil. In another example, the positive-side current collector 14a may be carbon-coated on at least one side. When the carbon coating is included, the thickness of the carbon coating on one side of the current collector 14a ranges from about 0.1 μm to about 2 μm.

Additional features of the positive electrode 14 may include: a porosity ranging from about 25% to about 35% and an electrical conductivity that is less than 2Ω·cm. Where the positive electrode 14 is based on lithium manganese oxide, the moisture content is less than 300 ppm. Where the positive electrode 14 is based on lithium nickel manganese cobalt oxide, the moisture content is less than 500 ppm. Where the positive electrode active material is lithium manganese oxide, then the positive electrode 14 has a pressing density ranging from about 2.5 g/$cm^3$ to about 2.9 g/$cm^3$. Where the positive electrode active material is lithium nickel manganese cobalt oxide, then the positive electrode 14 has a pressing density ranging from about 2.7 g/$cm^3$ to about 3.1 g/$cm^3$. When any example of the positive electrode 14 is coated on one side of the current collector 14a, the capacity loading may range from about 0.28 mAh/cm² to about 0.84 mAh/cm².

The separator 16, which operates as both an electrical insulator and a mechanical support, is sandwiched between the negative electrode 12 and the positive electrode 14 to prevent physical contact between the two electrodes 12, 14 and the occurrence of a short circuit. The separator 16, in addition to providing a physical barrier between the two electrodes 12, 14, ensures passage of lithium ions (identified by the black dots and by the open circles having a (+) charge in FIG. 4) and related anions (not shown) through an electrolyte solution filling its pores. This helps ensure that the lithium ion battery 10 functions properly.

The separator 16 may be a microporous polymer separator. The porosity of the separator 16 ranges from about 40% to about 60%. The thickness of the separator 16 ranges from about 10 μm to about 30 μm.

The separator 16 includes, or in some examples is, a membrane, and this membrane may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available polyolefin microporous polymer separators 16 include CELGARD® 2500 (a monolayer polypropylene separator) and CELGARD® 2320 (a trilayer polypropylene/polyethylene/polypropylene separator) available from Celgard LLC. Some other commercially available separators are available from Entek International, Asahi-Kasei Corporation, Toray Industries, and SK Energy.

In another example, the separator 16 may be formed from another polymer chosen from polyethylene terephthalate (PET), polyvinylidene fluoride (PVDF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 16 is poly(p-hydroxybenzoic acid). In yet another example, the membrane may be a combination of one of these polymers and a polyolefin (such as PE and/or PP).

In yet another example, the membrane of the separator 16 may be chosen from a combination of the polyolefin (such as PE and/or PP) and one or more of the polymers for the separator 16 listed above.

The separator 16 may contain a single layer or a multilayer laminate fabricated from either a dry or wet process, by solvent casting, by a non-woven fiber laying process, or by any other process for making a microporous polymer membrane with properties suitable for application in Li-ion batteries. For example, a single layer of the polyolefin may constitute the entirety of the separator 16. In another example, a single layer of one or a combination of any of the polymers from which the separator 16 may be formed (e.g., the polyolefin and/or one or more of the other polymers listed above for the separator 16) may constitute the entirety of the separator 16. As another example, however, multiple discrete layers of similar or dissimilar polyolefins and/or polymers for the separator 16 may be assembled into the separator 16. In one example, a discrete layer of one or more of the polymers may be coated and/or laminated on a discrete layer of the polyolefin for the separator 16. Further, the polyolefin (and/or other polymer) layer, and any other optional polymer layers, may further be included in the separator 16 as a fibrous layer to help provide the separator 16 with appropriate structural and porosity characteristics. Still other suitable polymer separators 16 include those that have a ceramic layer attached thereto, and those that have ceramic filler in the polymer matrix (i.e., an organic-inorganic composite matrix).

The separator 16 may further have at least one surface 16a on which the $TiB_2$ nanotubes 200 are coated. The amount of the $TiB_2$ nanotubes 200 in the coating may be in the same concentration range of 0.01 wt. % to 1 wt. %, based on the total weight percent of the LTO active material in the negative electrode 12.

Thus, as noted above, any or all of the negative electrode 12, the positive electrode 14, and the separator 16 may include the titanium diboride nanotubes 200. Further, carbon nanotubes, carbon fibers, and/or graphene may be added, in at least partial, but not total, replacement of the $TiB_2$ nanotubes 200.

Each of the negative electrode 12, the positive electrode 14, and the porous separator 16 is soaked in the electrolyte solution. It is to be understood that any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Examples of lithium salts that may be dissolved in an organic solvent to form the non-aqueous liquid electrolyte solution include $LiClO_4$, $LiAlCl_4$, $LiI$, $LiBr$, $LiSCN$, $LiBF_4$, $LiB(C_6H_5)_4$, $LiCF_3SO_3$, $LiN(CF_3SO_2)_2$ (LiTFSI), $LiN(FSO_2)_2$ (LiFSI), $LiAsF_6$, $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents such as cyclic carbonates (ethylene carbonate (EC), propylene carbonate (PC), butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The electrolyte solution may also include a number of additives, such as solvents and/or salts that are minor components of the solution. Example additives include lithium bis(oxalato borate) (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, thiophene, 3,4-ethylenedioxythiophene, 2,5-dihydrofuran, trishexafluoro-iso-propylphosphate, trihydroxybenzene, tetramethoxytitanium, etc. While some examples have been given herein, it is to be understood that other additives could be used. When included, additives may make up from about 0.05% to about 5% of the composition of the electrolyte solution.

In an example, the electrolyte solution has a conductivity greater than 1.8 mS/cm measured at $-30°$ C.

The lithium ion battery 10 as disclosed herein has a negative capacity to positive capacity ratio ranging from about 0.9 to about 1.05. The lithium ion battery 10 has an operational temperature ranging from about $-30°$ C. to about $70°$ C. The lithium ion battery 10 may be in the form of a pouch battery, a prismatic battery, or a cylindrical battery.

In an example of the method for making the lithium titanate negative electrode 12, the titanium diboride nanotubes 200 disclosed herein may be mixed with lithium titanate powder (active material 13), the conductive filler(s), and the binder(s). In an example of the method for making the positive electrode 14, any of the previously described active materials 15 may be mixed with the conductive filler(s) and the binder(s). The titanium diboride nanotubes 200 may also be mixed with the active material(s) 15, the conductive filler(s), and the binder(s).

For each of the electrodes 12, 14, the respective components may be manually mixed by dry-grinding. After all these components are ground together, the ground components are combined with water or organic solvent (depending on the binder used) to form the dispersion/mixture. In an example, the solvent is a polar aprotic solvent. Examples of suitable polar aprotic solvents include dimethylacetamide (DMAC), N-methyl-2-pyrrolidone (NMP), dimethylformamide (DMF), dimethylsulfoxide (DMSO), or another Lewis base, or combinations thereof.

The dispersion/mixture may be mixed by milling. Milling aids in transforming the dispersion/mixture into a coatable slurry. Low-shear milling or high-shear milling may be used to mix the dispersion/mixture. The dispersion/mixture milling time ranges from about 10 minutes to about 20 hours depending on the milling shear rate. In an example, a rotator mixer is used for about 20 minutes at about 2000 rpm to mill the dispersion/mixture.

The respective slurry may then be coated or deposited onto the respective current collector 12a, 14a. The slurry may be deposited using any suitable technique. As examples, the slurry may be cast on the surface of the current collector 12a, 14a, or may be spread on the surface of the current collector 12a, 14a, or may be coated on the surface of the current collector 12a, 14a using a slot die coater.

The deposited slurry may be exposed to a drying process in order to remove any remaining solvent and/or water. Drying may be accomplished using any suitable technique. For example, drying may be performed at an elevated temperature ranging from about $60°$ C. to about $130°$ C. In some examples, vacuum may also be used to accelerate the drying process. As one example of the drying process, the deposited slurry may be exposed to vacuum at about $120°$ C. for about 12 to 24 hours. The drying process results in the formation of the negative electrode 12 or the positive electrode 14.

The separator 16 may be coated with an appropriate amount of the titanium diboride nanotubes 200. A coating made up of a suitable adhesive and the $TiB_2$ nanotubes may be prepared. The coating may then be deposited onto surface 16a of the separator 16. Examples of a suitable deposition process include spray coating and doctor blading.

To further illustrate the present disclosure, examples are given herein. It is to be understood that these examples are provided for illustrative purposes and are not to be construed as limiting the scope of the present disclosure.

EXAMPLES

Example 1

Pouch cells were constructed using lithium titanate (LTO) as the active material for the negative electrode 12 and spinel lithium manganese oxide (LMO) as the active material for the positive electrode 14. The separator 16 was a microporous tri-layered polypropylene (PP) and polyethylene (PE) polymer membrane, and the electrolyte was 1 M $LiPF_6$ in a mixed solution of ethylene carbonate and diethyl carbonate (1:2 volume ratio). The following conditions were followed: 5 C charge/10 C discharge cycling protocol at $45°$ C.

The weight of $H_2$ gas generated in the cell was found to be $4.51 \times 10^{-5}$ g $H_2$/g LTO. Table I shows additional data determined in this Example, in which V is the pouch cell volume.

TABLE I

| Hydrogen Gas Generated in LMO/LTO Cells. | | | |
|---|---|---|---|
| Mass of LTO, g | | V, ml | Gas Volume, ml | Calculated $H_2$ Gas Volume, ml |
| 4.562 | Cell 1, after 2000 cycles | 23.1 | 5.7 | |
| | Cell 2, after 2000 cycles | 22.6 | 5.2 | |
| | Cell 3, after 2000 cycles | 21.6 | 4.2 | |
| | Cell before testing | 17.4 | | |
| | | Avg. for cells 1-3 = 5.03 | | 2.52 |

Before testing, the pouch cell volume was 17.4 ml, and after 2000 cycles, the pouch cell volume increased to 23.1 ml, for example, for Cell 1. So the volume of the generated gas was 23.1−17.4=5.7 ml for Cell 1. The average volume of the generated gas (for the three cells) was (5.7+5.2+4.2)/3=5.03 ml and the pure $H_2$ was calculated to be 5.03×50% $H_2$=2.52 ml $H_2$.

Prophetic Example 1

$TiB_2$ nanotubes exhibit high hydrogen storage of 5.5 wt %. Based on this property, it is possible to calculate the amount of $TiB_2$ nanotubes needed to completely immobilize $H_2$ generated in the LTO cell of Example 1. If the total active amount of LTO is 4.562 g (Table I), and if the weight of $H_2$ gas generated in the cell is $4.51 \times 10^{-5}$ g $H_2$/g LTO (Example 1), then the amount of $TiB_2$ nanotubes calculated based on 5.5 wt. % $H_2$ storage is 3.74 mg $TiB_2$ (0.082 wt. % LTO).

Example 2

Pouch cells were constructed using lithium titanate (LTO) as the active material for the negative electrode 12 and lithium nickel manganese cobalt oxide (NMC) as the active material for the positive electrode 14. The separator 16 was a microporous tri-layered polypropylene (PP) and polyethylene (PE) polymer membrane, and the electrolyte was 1 M $LiPF_6$ in a mixed solution of ethylene carbonate and diethyl carbonate (1:2 volume ratio). The following conditions were followed: 5 C charge/10 C discharge cycling protocol at 45° C.

The weight of $H_2$ gas generated in the cell was found to be $1.94 \times 10^{-5}$ g $H_2$/g LTO. Table II shows additional data determined in this Example.

TABLE II

Hydrogen Gas Generated in NMC/LTO Cells.

| Mass of LTO, g | | V, ml | Gas Volume, ml | Calculated $H_2$ Gas Volume, ml |
|---|---|---|---|---|
| 4.562 | Cell 1, after 2000 cycles | 19 | 2.4 | |
| | Cell 2, after 2000 cycles | 18.6 | 2.2 | |
| | Cell 3, after 2000 cycles | 18.7 | 2.1 | |
| | Cell before testing | 16.6 | | |
| | | | Avg. for cells 1-3 = 2.17 | 1.08 |

Prophetic Example 2

Based on the high hydrogen storage property of the $TiB_2$ nanotubes (5.5 wt % in the nanotubes), it is possible to calculate the amount of $TiB_2$ nanotubes needed to completely immobilize $H_2$ generated in the LTO cell of Example 2. If the total active amount of LTO is 4.562 g (Table II), and if the weight of $H_2$ gas generated in the cell is $1.94 \times 10^{-5}$ g $H_2$/g LTO (Example 2), then the amount of $TiB_2$ nanotubes calculated based on 5.5 wt. % $H_2$ storage is 1.61 mg $TiB_2$ (0.035 wt. % LTO).

It is to be understood that the ranges provided herein include the stated range and any value or sub-range within the stated range. For example, a range from about 100 nm to about 200 nm should be interpreted to include not only the explicitly recited limits of about 100 nm to about 200 nm, but also to include individual values, such as 175 nm, 190 nm, etc., and sub-ranges, such as from about 165 nm to about 185 nm, etc. Furthermore, when "about" is utilized to describe a value, this is meant to encompass minor variations (up to ±10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise While several examples have been described in detail, it is to be understood that the disclosed examples may be modified. Therefore, the foregoing description is to be considered non-limiting.

The invention claimed is:

1. A lithium ion battery, comprising:
   an electrolyte maintained in a separator, the separator having two sides;
   a negative electrode including a lithium titanate ($Li_4Ti_5O_{12}$) active material disposed on one side of the separator;
   a negative current collector associated with the negative electrode;
   a positive electrode disposed on an opposite side of the separator;
   a positive current collector associated with the positive electrode; and
   gas traps to trap gases generated by the lithium titanate ($Li_4Ti_5O_{12}$) active material in the battery, wherein the gas traps include titanium diboride ($TiB_2$) nanotubes, and wherein the titanium diboride nanotubes are disposed in one or more of the negative electrode, the positive electrode, and the separator in an amount ranging from about 0.01 wt. % to about 1 wt % based on a total wt. % of the lithium titanate active material in the negative electrode.

2. The lithium ion battery as defined in claim 1 wherein the $TiB_2$ nanotubes are selected from the group consisting of single wall nanotubes, double wall nanotubes, and multi-wall nanotubes.

3. The lithium ion battery as defined in claim 2 wherein the $TiB_2$ nanotubes have an outer diameter within a range of about 2.6 nm to about 26 nm, a length within a range of about 50 nm to about 1 μm, and an inside diameter within a range of about 2 nm to about 20 nm.

4. The lithium ion battery as defined in claim 3 wherein the gas traps further include one or more of carbon nanotubes, carbon fibers, and graphene.

5. A method, comprising:
   providing gas traps in a lithium ion battery having a negative electrode including a lithium titanate ($Li_4Ti_5O_{12}$) active material, wherein the gas traps are selected from the group consisting of titanium diboride ($TiB_2$) nanotubes, carbon nanotubes, carbon fibers, graphene, and combinations thereof, and wherein the gas traps trap gases generated by the lithium titanate ($Li_4Ti_5O_{12}$) active material in the lithium ion battery.

6. The method as defined in claim 5 wherein the lithium ion battery includes:
   an electrolyte maintained in a separator, the separator having two sides;
   the negative electrode disposed on one side of the separator;
   a negative current collector associated with the negative electrode;
   a positive electrode disposed on an opposite side of the separator; and
   a positive current collector associated with the positive electrode.

7. The method as defined in claim 5 wherein the $TiB_2$ nanotubes are selected from the group consisting of single wall nanotubes, double wall nanotubes, and multi-wall nanotubes.

8. The method as defined in claim 7 wherein the $TiB_2$ nanotubes have an outer diameter within a range of about 2.6 nm to about 26 nm, a length within a range of about 50 nm to about 1 μm, and an inside diameter within a range of about 2 nm to about 20 nm.

9. The method as defined in claim 6 wherein the $TiB_2$ nanotubes are intentionally included in the negative electrode, or in the positive electrode, or on the separator, or combinations thereof.

10. The method as defined in claim 9 wherein the $TiB_2$ nanotubes are present within the lithium ion battery in an amount ranging from about 0.01 wt. % to about 1 wt. % based on a total wt. % of the lithium titanate in the negative electrode.

11. An improved lithium ion battery having a negative electrode including a lithium titanate ($Li_4Ti_5O_{12}$) active material that is in contact with an electrolyte, wherein the improvement comprises gas traps to trap gases generated by the lithium titanate ($Li_4Ti_5O_{12}$) active material during operation of the battery, wherein the gas traps include titanium diboride ($TiB_2$) nanotubes, and wherein the titanium diboride nanotubes are multi-wall nanotubes and each wall of the multi-wall nanotubes has a thickness of about 3 Ångstroms.

12. The improved lithium ion battery as defined in claim 11 wherein the lithium ion battery includes:
the electrolyte maintained in a separator, the separator having two sides;
the negative electrode disposed on one side of the separator;
a negative current collector associated with the negative electrode;
a positive electrode disposed on an opposite side of the separator; and
a positive current collector associated with the positive electrode.

13. The improved lithium ion battery as defined in claim 12 wherein the $TiB_2$ nanotubes are in the negative electrode, or in the positive electrode, or on the separator, or combinations thereof, and wherein the $TiB_2$ nanotubes are present within the lithium ion battery in an amount ranging from about 0.01 wt. % to about 1 wt. % based on a total wt. % of the lithium titanate.

14. The improved lithium ion battery as defined in claim 11 wherein the $TiB_2$ nanotubes have an outer diameter within a range of about 2.6 nm to about 20.6 nm, a length within a range of about 50 nm to about 1 μm, and an inside diameter within a range of about 2 nm to about 20 nm.

15. The improved lithium ion battery as defined in claim 11 wherein the gas traps further include one or more of carbon nanotubes, carbon fibers, and graphene.

16. The lithium ion battery as defined in claim 1 wherein the gas traps have a surface area ranging from about 500 $m^2/g$ to about 2,500 $m^2/g$.

17. The lithium ion battery as defined in claim 2 wherein the $TiB_2$ nanotubes are multi-wall nanotubes and each wall of the multi-wall nanotubes has a thickness of about 3 Ångstroms.

* * * * *